UNITED STATES PATENT OFFICE.

GEORGE C. HOLDERER, OF NAMUR, BELGIUM.

MANUFACTURE OF BEER.

SPECIFICATION forming part of Letters Patent No. 224,186, dated February 3, 1880.

Application filed August 12, 1879.

*To all whom it may concern:*

Be it known that I, GEORGE CHARLES HOLDERER, of Namur, in the Kingdom of Belgium, have invented a new and valuable Improvement in the Manufacture of Beer; and I do hereby declare that the following is a full, clear, and exact description of the mode in which the same is to be carried out in practice.

The object of the invention is to make beer perfectly clear and effervescent at a low temperature, where it has been heretofore feculent or thick from the presence of gluten.

In my process the first and second fermentations are effected at a temperature from 41° to 68° Fahrenheit, I having found out by experiment that the higher the temperature of the beer during fermentation the more rapidly will it mature.

As soon as the beer has lost its fresh or new taste I cool it down to 32° Fahrenheit, at which temperature it is charged with carbonic-acid gas by any of the usual methods, and in the progress of cooling the particles of albumen are separated by isinglass or any equivalent substance. By this simple and inexpensive process a beer that is clear and of fine flavor may be obtained in a short time and at a small expense. If it is desired to produce a beer but little attenuated, beer is added during the first fermentation.

Having thus described all that is necessary to a full understanding of my invention, what I claim as new is—

The process of making beer which consists in effecting the first and second fermentations at a temperature from 41° to 68° Fahrenheit; secondly, after it has lost its new or fresh taste, in reducing the temperature to about 32° Fahrenheit; and, thirdly, while at this low temperature, charging it with carbonic-acid gas, as described.

In testimony that I claim the foregoing I have hereunto set my hand.

GEORGE CHARLES HOLDERER.

Witnesses:
 JOSEPH BREPST,
 DÉSIRÉ DURIEUSE.